(12) United States Patent
Chen et al.

(10) Patent No.: US 8,112,268 B2
(45) Date of Patent: Feb. 7, 2012

(54) METHOD AND SYSTEM FOR PRIORITIZING COMMUNICATIONS BASED ON SENTENCE CLASSIFICATIONS

(75) Inventors: Zheng Chen, Beijing (CN); Wei-Ying Ma, Beijing (CN); Hua-Jun Zeng, Beijing (CN); Benyu Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 730 days.

(21) Appl. No.: 12/254,796

(22) Filed: Oct. 20, 2008

(65) Prior Publication Data

US 2009/0106019 A1    Apr. 23, 2009

Related U.S. Application Data

(62) Division of application No. 10/930,687, filed on Aug. 31, 2004, now Pat. No. 7,567,895.

(51) Int. Cl.
*G06F 17/28* (2006.01)

(52) U.S. Cl. .................. 704/4; 704/1; 704/9; 704/10

(58) Field of Classification Search .................. 704/4, 1, 704/10, 9
See application file for complete search history.

(56) References Cited

U.S. PATENT DOCUMENTS

| | | |
|---|---|---|
| 5,671,425 A | 9/1997 | Suematsu et al. |
| 5,694,616 A | 12/1997 | Johnson et al. |
| 6,161,130 A | 12/2000 | Horvitz et al. |
| 6,247,043 B1 | 6/2001 | Bates et al. |
| 6,675,159 B1 * | 1/2004 | Lin et al. .......................... 1/1 |
| 7,016,827 B1 | 3/2006 | Ramaswamy et al. |
| 2002/0065845 A1 * | 5/2002 | Naito et al. ................. 707/500.1 |
| 2002/0076112 A1 | 6/2002 | Devara |
| 2004/0006736 A1 * | 1/2004 | Kawatani ....................... 715/500 |
| 2006/0026298 A1 | 2/2006 | Zeng |
| 2006/0047497 A1 | 3/2006 | Chen et al. |

OTHER PUBLICATIONS

Balter, Olle et al., "Bifrost Inbox Organizer: Giving Users Control Over the Inbox," Oct. 2, 2002 (20 pages).
Berghel, Hal, "Email: The good, the bad and the ugly," Digital Village, Jan. 14, 1997 (6 pages).
Boone, Gary, "Concept Features in Re: Agent, An Intelligent Email Agent," Autonomous Agents 98 Minneapolis, MN, Copyright 1998 (7 pages).
Cohen, William W., "Learning to Classify Email into 'Speech Acts,'" Online, Jul. 2004, http://www.cs.cmu.edu/[tom/EMNLP2004_final.pdf.
Corston-Oliver, Simon et al., "Task-Focused Summarization of Email," Online, Jul. 2004 http://acl.ldc.upenn.edu/ac12004/textsummarization/pdf/Corston.pdf.
European Search Report, European Patent Application No. EP 05 10 7797, Microsoft Coproration, Nov. 17, 2006.

(Continued)

*Primary Examiner* — Qi Han
(74) *Attorney, Agent, or Firm* — Perkins Coie LLP

(57) ABSTRACT

A method and system for prioritizing communications based on classifications of sentences within the communications is provided. A sentence classification system may classify sentences of communications according to various classifications such as "sentence mode." The sentence classification system trains a sentence classifier using training data and then classifies sentences using the trained sentence classifier. After the sentences of a communication are classified, a document ranking system may generate a rank for the communication based on the classifications of the sentences within the communication. The document ranking system trains a document rank classifier using training data and then calculates the rank of communications using the trained document rank classifier.

15 Claims, 17 Drawing Sheets

OTHER PUBLICATIONS

Kiritchenko, Svetiana et al., "Email Classification with Co-Training," School of Information Technology and Engineering, University of Ottawa, Ottawa, Canada, Nov. 2001 (10 pages).

Ko, Youngjoong et al., "Improving Text Categorization Using the Importance of Sentences," Elsevier, Information Processing and Management 40, 2004.

Lee et al., "An Empirical Evaluation of Knowledge Sources and Learning Algorithms for Word Sense Disambiguation," Porceedings of the Conference on EMNLP, Jul. 2002, pp. 41-48.

McDonald, Daniel and Chen, Hsinchun, "Using Sentence-Selection Heuristics to Rank Text Segments in TXTRACTOR," JCDL '02, Jul. 13-17, 2002.

Megginsoln, David, "The Purpose of a Sentence," Copyright 1994, 1995 and 1996 by the University of Ottawa (2 pages) http://www.uotawa.ca/academic/arts/writcent/hypergrammar/sntpurps.html.

Schmitt, Beverly, "Sentence Fun," Copyright 1997-2002 (11 pages).

Sebastiani, Fabrizio, "Machine Learning in Automated Text Categorization," ACM Computing Surveys, vol. 34, No. 1, Mar. 2002.

Shen, Dou et al., "Web-page Classification Through Summarization," SIGIR '04 Jul. 25-29, 2004, Sheffield, South Yorkshire, UK, Copyright 2004 ACM.

Shimbo, Masashi et al., "Automatic Classification of Sentences in the MEDLINE Abstracts: A Case Study of the Power of Word Sequence Features," Graduate School of Information Science, Japan, Mar. 2003 (4 pages).

Whittaker, Steve et al., "Contact Management: Identifying Contacts to Support Long-Term Communication," CSCW '02 Nov. 16-20, 2002, New Orleans, Louisiana (10 pages).

* cited by examiner

METHOD AND SYSTEM FOR PRIORITIZING COMMUNICATIONS BASED ON SENTENCE CLASSIFICATIONS

This application is a divisional application of U.S. patent application Ser. No. 10/930,687, now U.S. Pat. No. 7,567,895, filed on Aug. 31, 2004, and entitled "METHOD AND SYSTEM FOR PRIORITIZING COMMUNICATIONS BASED ON SENTENCE CLASSIFICATIONS," which is incorporated herein in its entirety by reference.

TECHNICAL FIELD

The described technology relates to prioritizing communications, such as electronic mail messages.

BACKGROUND

A person can receive many hundreds of electronic communications each day. The electronic communications can include electronic mail messages, voice mail messages, memoranda, documents, and so on. Because of the large number of communications, especially electronic mail messages, that a person can receive, it can be very time-consuming for a user to access and process all their communications. Indeed, because of the large number of electronic mail messages, it may be difficult for a user to identify an important electronic mail message that may need prompt attention out of all the electronic mail messages of lesser importance. To help locate messages, some electronic mail systems allow a person to specify the order in which electronic mail messages are displayed. For example, a person can specify that electronic mail messages be ordered based on time of delivery, sender, subject, and so on.

These techniques for ordering electronic mail messages and other communications do not, however, provide much useful insight into the importance of communications. For example, if an employee wants to view electronic mail messages that require prompt attention as soon as possible, the employee, short of reviewing all electronic mail messages, may need to rely on ordering based on the sender's designation of an electronic mail message as important. Such importance, however, reflects the importance to the sender, not necessarily the importance to the recipient. Moreover, importance does not reflect whether prompt attention is needed.

It would be desirable to provide a technique that would allow for communications to be automatically prioritized so a person can focus their attention on communications that are important or need prompt attention before focusing their attention on communications that are of lesser importance or do not need prompt attention.

SUMMARY

A method and system for prioritizing communications based on classifications of sentences within the communications is provided. A sentence classification system may classify sentences of communications according to various classifications such as "sentence mode." The sentence classification system trains a sentence classifier using training data that provides features of the sentences and corresponding classifications. The system then classifies sentences using the trained sentence classifier by providing features of the sentences and receiving the classifications in return. After the sentences of a communication are classified, a document ranking system may generate a rank for the communication based on the classifications of the sentences within the communication. The document ranking system trains a document rank classifier using training data that provides classifications of the sentences of the communications and a rank of the communications. The system then calculates the rank of communications using the trained document rank classifier by providing the classifications of the sentences and receiving the rank in return.

DETAILED DESCRIPTION

Figure 1:
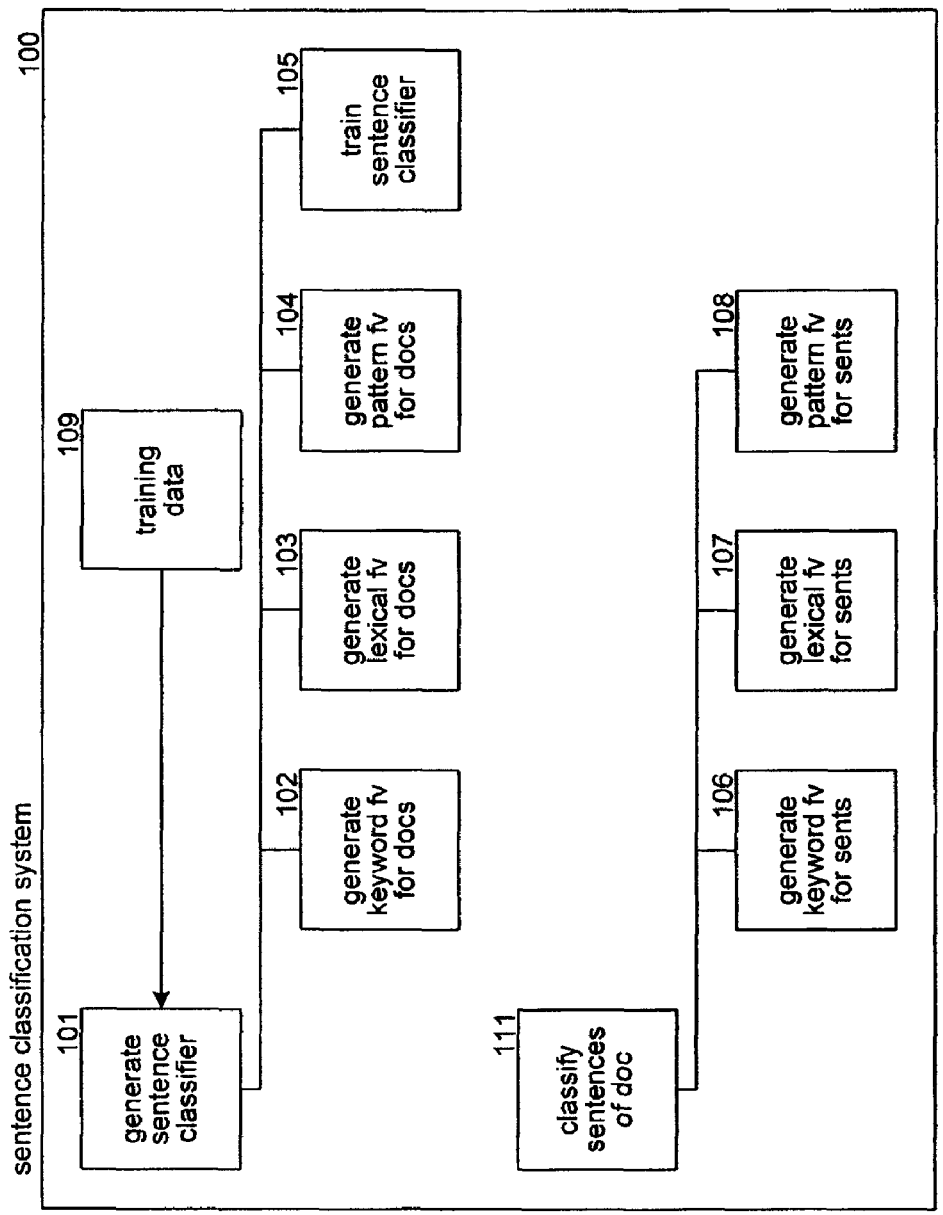
FIG. 1 is a block diagram that illustrates the components of the sentence classification system in one embodiment.

A method and system for prioritizing communications based on classifications of sentences within the communications is provided. In one embodiment, a prioritization system includes a sentence classification system and a document ranking system. The sentence classification system may classify sentences of communications according to various classifications such as "sentence mode." Sentence mode refers to whether a sentence is declarative, interrogative, imperative, appreciative, exclamatory, and so on. After the sentences of the communications are classified, the document ranking system then generates a ranking of the communications (i.e., prioritization) based on the classifications of the sentences within the communications. For example, the communication ranking system may rank communications with many imperative sentences higher than communications with only declarative sentences. The prioritization system may be used to prioritize electronic mail messages. In this way, the recipient of the electronic mail messages can focus their attention on communications with a high priority or ranking before focusing their attention on communications with a lower priority. In the following, an embodiment of the prioritization system that prioritizes electronic mail message is described. The prioritization system may be used to prioritize any type of communications or other documents. In addition, the term "sentence," as used in this description, refers to a complete sentence, a sentence fragment, or any collection of words.

In one embodiment, the sentence classification system trains a sentence classifier based on training data that includes electronic mail messages and the classification of each sentence within the messages. For example, the training data may include a message with the sentence "We are going to South Dakota on Friday" that is classified as declarative. The sentence classification system may represent each sentence by a sentence feature vector of sentence features that include a keyword feature, a lexical feature, and a pattern feature. Thus, a sentence may be represented by a 3-tuple of (k, l, p) where k represents the keyword feature, l represents the lexical feature, and p represents the pattern feature. Before generating the sentence features for a document, the sentence classification system may tokenize the words of the document by normalizing the word, removing stop words, stemming the words, and so on.

The keyword features may represent the weights of the keywords of a sentence within a document. In one embodiment, the weights are calculated using a term frequency by inverted document frequency metric (e.g., TF*IDF). The sentence classification system may initially calculate the document frequency of each keyword within the training data. The document frequency for a keyword represents a count of the number of documents that contain the keyword. The sentence classification system can then calculate the weight of each keyword for a document based on term frequency of that keyword within that document and the inverted document frequency. A keyword feature vector for a sentence includes the weights of the keywords within the sentence.

The lexical features may represent the parts of speech, phrases, and named entities of a sentence. The sentence classification system may identify the part of speech of each word (e.g., non-stop word) and represent the parts of speech of a sentence as a vector of the parts of speech of the words within the sentence. Continuing with the example from above, the parts of speech for the words of the sentence are pronoun for "we," auxiliary verb for "are," participle for "going," preposition for "to," and so on. A phrase is a sequence of words of the sentence that represents a syntactic unit. Continuing with the example from above, the sentence includes the phrase "South Dakota." A named entity refers to an entity (e.g., person, city, and company) that has a name. Continuing with the example from above, the phrase "South Dakota" is a named entity for a state. A lexical feature vector for a sentence comprises a vector of the parts of speech, a vector for the phrases, and a vector for the named entities of the sentence.

The pattern feature of a sentence is a generalized sentence pattern that is most similar to a generalization of the sentence. Continuing with the example from above, the generalization of the sentence may be "person action object time," which may be most similar to the generalized sentence pattern of "thing action." A pattern feature vector for the sentence is that generalized sentence pattern.

In one embodiment, the sentence classification system represents each sentence of the training data by its sentence feature vector and then trains a sentence classifier to classify sentences represented by their sentence feature vectors based on sentence mode. The sentence classifier may be an Ada-boosting classifier, a support vector machine, or some other classifier. The sentence classification system provides the sentence feature vector and sentence mode pairs of the training data for training of the sentence classifier.

After the sentence classifier has been trained, the sentence classification system uses the sentence classifier to classify sentences of a document. To classify the sentences of a document, the sentence classification system generates the sentence feature vector for each sentence of the document as described above. The sentence classification system then submits the sentence feature vector for each sentence to the sentence classifier. The sentence classifier identifies the sentence mode of each sentence of the document based on its training.

The document ranking system may train a document rank classifier based on the training data that includes documents with sentences along with a ranking of each document. To train the document rank classifier, the document ranking system represents a document by a document feature vector that includes the classification of each sentence of the document. For example, a document with the sentences "we are going to South Dakota this Friday" and "what should we bring" may be represented by the document feature vector of (imperative, interrogative). The document ranking system uses the sentence classification system to classify sentences. The document ranking system trains the document rank classifier based on document feature vector and ranking pairs for the documents of the training data. The document rank classifier may be an Ada-boosting classifier, a support vector machine, or some other classifier. Once the document rank classifier has been trained, then the document ranking system is ready to rank documents. The document ranking system ranks a document by generating the document feature vector for the document using the sentence classification system. The document ranking system then submits the document feature vector of the document to the document rank classifier, which calculates the ranking for the document.

FIG. 1 is a block diagram that illustrates the components of the sentence classification system in one embodiment. The sentence classification system 100 includes a generate sentence classifier component 101 and a classify sentences of a document component 111. The sentence classification system also includes a generate keyword feature vector for documents component 102, a generate lexical feature vector for documents component 103, a generate pattern feature vector for documents component 104, and a train sentence classifier component 105. These components also invoke a generate keyword feature vector for sentences component 106, a generate lexical feature vector for sentences component 107, and a generate pattern feature vector for sentences component 108. The generate sentence classifier component uses the training data 109 to train the sentence classifier. The training data includes electronic mail messages along with the sentence mode of each sentence of each message. The generate sentence classifier component generates a sentence feature vector for each sentence of the training data using the generate keyword feature vector for documents component, the generate lexical feature vector for documents component, and the generate pattern feature vector for documents component. The generate keyword feature vector for documents component generates the keyword feature vectors for the sentences of a document by invoking the generate keyword feature vector for sentences component for each document. The generate lexical feature vector for documents component generates the lexical feature vectors for the sentences of a document by invoking the generate lexical feature vector for sentences component for each document. The generate pattern feature vector for documents component generates the pattern feature vector for sentences of a document by invoking the generate pattern feature vector for sentences component for each document. The classify sentences of a document component generates a sentence feature vector for each sentence of a document by invoking the generate keyword feature vector for sentences component, the generate lexical feature vector for sentences component, and the generate pattern feature vector for sentences component. The classify sentences of a document component then submits the sentence feature vector for each sentence to the trained sentence classifier to classify the sentence.

Figure 2:
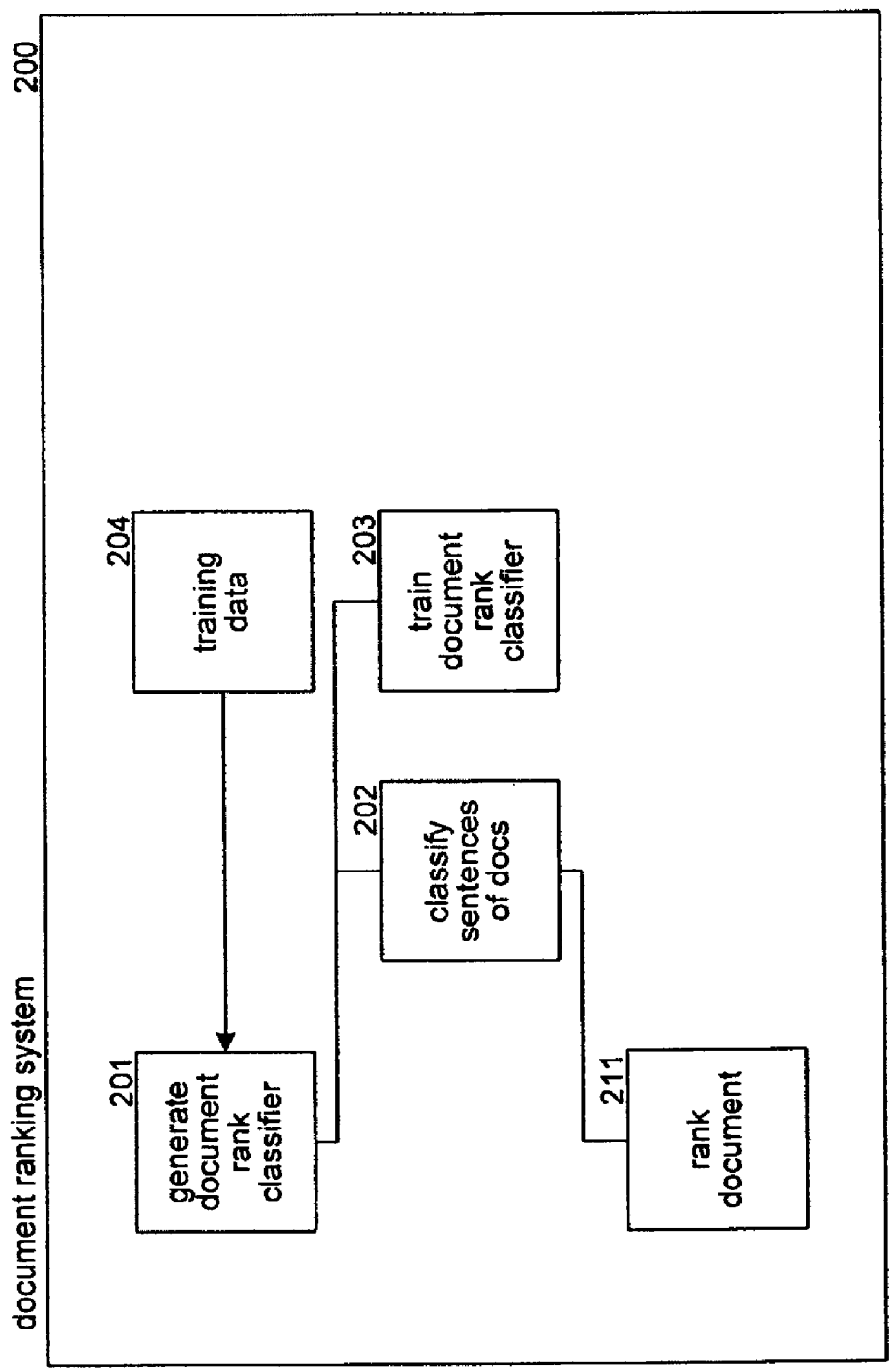
FIG. 2 is a block diagram that illustrates the components of the document ranking system in one embodiment.

FIG. 2 is a block diagram that illustrates the components of the document ranking system in one embodiment. The document ranking system 200 includes a generate document rank classifier component 201 and a rank document component 211. The generate document rank classifier component generates the document rank classifier by generating, for each document of training data 204, a document feature vector that includes the sentence classification of the sentences of the documents. The generate document rank classifier component invokes a classify sentences of document component 202 to generate the document feature vector for each document of the training data. The generate document rank classifier component trains the document rank classifier by invoking the train document rank classifier component 203, passing the document feature vector and ranking pairs for each document. The rank document component invokes the classify sentences of document component to generate the document feature vector for a document to be ranked. The rank document component then submits the document feature vector to the trained document rank classifier to generate the ranking for the document.

The computing device on which the prioritization system is implemented may include a central processing unit, memory, input devices (e.g., keyboard and pointing devices), output devices (e.g., display devices), and storage devices (e.g., disk drives). The memory and storage devices are computer-readable media that may contain instructions that implement the prioritization system. In addition, the data structures and message structures may be stored or transmitted via a data transmission medium, such as a signal on a communications link. Various communications links may be used, such as the Internet, a local area network, a wide area network, or a point-to-point dial-up connection.

The prioritization system may be implemented in various operating environments that include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The prioritization system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

The prioritization system may classify sentences based on sentence mode. Sentence mode is illustrated by the following examples. A declarative sentence mode corresponds to a sentence that makes a declaration. The following sentences are examples of sentences with a declarative sentence mode.

It's lunchtime.
We are going to South Dakota on Friday.
My car is out of gasoline.
My parents keep telling me that I should make good grades so that I can get a job or go to college.

An interrogative sentence mode corresponds to a sentence that asks a question. The following sentences are examples of sentences with an interrogative sentence mode.

What time does the movie start?
How many people from your graduating class went to college?
Is there a reason why those dirty clothes are in the middle of the floor?
What are they serving in the cafeteria today?

An imperative sentence mode corresponds to a sentence that is a command. The following sentences are examples of sentences with an imperative sentence mode.

Could you please answer these questions?
Wash the car.
Please donate to the community charity fund.
I think we can have a discussion on it.
How about a meeting this Friday?

An exclamatory sentence mode corresponds to a sentence that makes an exclamation. The following sentences are examples of sentences with an exclamatory sentence mode.

What a beautiful night!
How happy we were when the dawn came!
What did you do to your hair!
I just won $500!

An appreciative sentence mode corresponds to a sentence in which appreciation is expressed. The following sentences are examples of sentences with an appreciative sentence mode.

Thank you for the information.
It's been great meeting you all today.
We appreciate your help.

An attach sentence mode corresponds to a sentence of a communication, typically an electronic mail message, in which the author expresses an intent to attach a document to the communication. The attach sentence mode may be a further classification of another sentence mode such as declarative or imperative. An attach sentence mode may have significant meaning in communications and may be particularly relevant to ranking such communications. The following sentences are examples of sentences with an attach sentence mode.

Attached is the file that needs to be reviewed.
This is the draft I received from Bill.
Please review the attached spreadsheet.
Have you reviewed the attached spreadsheet?

One skilled in the art will appreciate that many different sentence classifications and sentence modes can be defined. For example, the sentence classifications may be defined based on a domain associated with a person. In such a case, a medical center may further classify sentences as requesting an appointment, canceling an appointment, confirming an appointment, requesting a refill of a prescription, requesting health records, and so on. The medical center can prioritize electronic mail communications based on the classification of the sentences within the messages.

The pattern feature vector of a sentence is in one embodiment a generalized sentence pattern. The sentence classification system may use a generalized sentence pattern ("GSP")

system to identify the generalized sentence patterns. The GSP system generates a "generalized sentence" form of each sentence within the training data. A generalized sentence is an abstraction or generalization of the words (e.g., nouns) of the sentence. For example, a sentence of an electronic mail message may be "Talk by John Smith on May 10, 2003." The noun "person" may be generalized from "John Smith," the noun "date" may be generalized from "May 23, 2003," the noun "talk" might not be generalized, and the stop words "by" and "or" may be removed. In the example, the corresponding generalized sentence is "talk person date."

The GSP system identifies "generalized sentence patterns" that occur within a set of generalized sentences. One generalized sentence may be a subset of another generalized sentence in that the superset generalized sentence contains all the words of the subset generalized sentence. For example, the generalized sentence "talk person" is a subset of the generalized sentence "talk person date." The GSP system selects as generalized sentence patterns those generalized sentences that frequently occur as subsets of other generalized sentences. For example, the GSP system may use a frequent itemset algorithm to identify the generalized sentence patterns from the generalized sentences.

In practice, however, there may be many redundant generalized sentence patterns or many of the generalized sentence patterns may define too detailed a level for a pattern feature. In such a case, the GSP system may attempt to remove redundancies and group together generalized sentence patterns that are similar at a more general level to represent groups of similar generalized sentence patterns. For example, since the generalized sentence pattern "talk person date" may be redundant with the generalized sentence pattern "presentation person date," the GSP system may combine them into a more general generalized sentence pattern. Also, the generalized sentence patterns "talk date" and "talk person" may represent too detailed a level. As a result, the GSP system may combine them into a more generalized sentence pattern.

In one embodiment, the sentence classification system uses a natural language processor to help generate lexical and pattern feature vectors. The natural language processor takes a sentence as input and builds a syntax tree for the sentence. An example syntax tree for the sentence "Welcome John Smith" indicates that "welcome" is a verb and "John Smith" is a noun. The natural language processor then generates generalizations of the parts of speech for nouns or noun phrases, such as person, date, and place. For example, the natural language processor may generalize the noun "John Smith" to "person." The resulting generalized sentence is "welcome person." The generalization captures the semantic meaning of the nouns. The natural language processor may use a statistical language model to identify the generalization. One suitable natural language processor is NLPWin, which is described in G. Heidorn, "Intelligent Writing Assistance," *Handbook of Natural Language Processing*, edited by R. Dale, H. Moisl, and H. Somers (M. Dekker, New York, 1999), which is hereby incorporated by reference.

A generalized sentence pattern may be defined as a generalized sentence that has sufficient "support" within the generalized sentences to represent a pattern. In one embodiment, the support for a generalized sentence to be a generalized sentence pattern indicates the number of generalized sentences that are supersets of (or contain) the generalized sentence. For example, since the generalized sentence "welcome person date" contains the generalized sentence "welcome person," it supports "welcome person" as a generalized sentence pattern. Support may be defined more formally as:

$$sup(p) = |\{s \mid s \in S \hat{} p \subseteq s\}| \quad (1)$$

where sup(p) represents the support of generalized sentence p to be a generalized sentence pattern, s is a generalized sentence in the set of sentences S, |X| represents the number of elements in the set X, and $p \subseteq s$ indicates whether the generalized sentence s contains the generalized sentence p. A generalized sentence is an abstraction or generalization of the words (e.g., nouns) of the sentence. (See, ¶0038.) The pattern feature of a sentence is a generalized sentence pattern that is most similar to a generalization of the sentence. (See, ¶0027.) According to this definition, support of a generalized sentence is a count of the number of generalized sentences that contain that generalized sentence. A generalized sentence pattern may be defined when:

$$sup(p) >= min\_sup \quad (2)$$

where min_sup is the minimum support needed for a generalized sentence to be considered a generalized sentence pattern.

The GSP system may apply frequent itemset mining techniques directly to the generalized sentences to identify the generalized sentence patterns in a set of generalized sentences, rather than calculating the support for each generalized sentence, which can be computationally complex. Frequent itemsets, however, may contain a lot of redundant information. For example, if an itemset p has the same support as one of its supersets q and both of them are frequent, then p is redundant because it provides no more information than its superset q. To eliminate redundant generalized sentence patterns, the GSP system uses a mining technique to identify frequent "closed" itemsets. An itemset is closed when all of its superset itemsets are less frequent than the itemset itself. Since the set of frequent closed itemsets may be much smaller than the complete set of frequent itemsets, it is a more concise representation of the complete set of frequent itemsets without information loss. The GSP system can be adapted to use any of a variety of frequent closed itemset mining algorithms to mine "closed" generalized sentence patterns. For example, a suitable frequent closed itemset mining algorithm is described in M. Zaki and C. Hsiao, "CHARM: An Efficient Algorithm for Closed Itemset Mining" (SDM, 2002). One skilled in the art will appreciate that the GSP system can be used with closed or not closed generalized sentence patterns. Thus, in the following, the term "generalized sentence patterns" will be used to refer to either closed or not closed generalized sentence patterns. One skilled in the art will also appreciate that the generalized sentence patterns that are mined may not be identical to any one of the generalized sentences, but rather they may contain words derived from different generalized sentences. Generalized sentence patterns are described in U.S. application Ser. No. 10/880,662, entitled "Method and System for Clustering Using Generalized Sentence Patterns," filed on Jun. 30, 2004, which is hereby incorporated by reference.

The sentence classifier and the document rank classifier may be support vector machines in one embodiment and an Ada-boosting classifier in another embodiment. A support vector machine operates by finding a hyper-surface in the space of possible inputs. The hyper-surface attempts to split the positive examples from the negative examples by maximizing the distance between the nearest of the positive and negative examples to the hyper-surface. This allows for correct classification of data that is similar to but not identical to the training data. Various techniques can be used to train a support vector machine. One technique uses a sequential minimal optimization algorithm that breaks the large quadratic programming problem down into a series of small quadratic programming problems that can be solved analytically. (See Sequential Minimal Optimization, at http://research.microsoft.com/~jplatt/smo.html.)

Ada boosting is an iterative process that runs multiple tests on a collection of training data. Ada boosting transforms a weak learning algorithm (an algorithm that performs at a level only slightly better than chance) into a strong learning algorithm (an algorithm that displays a low error rate). The weak learning algorithm is run on different subsets of the training data. The algorithm concentrates more and more on those examples in which its predecessors tended to show mistakes. The algorithm corrects the errors made by earlier weak learners. The algorithm is adaptive because it adjusts to the error rates of its predecessors. Ada boosting combines rough and moderately inaccurate rules of thumb to create a high-performance algorithm. Ada boosting combines the results of each separately run test into a single, very accurate classifier.

Ada boosting assembles weak classifiers into a strong one. Let $S=\{(x_1,y_1),(x_2,y_2),\ldots,(x_m,y_m)\}$ be a set of training data. A weak learning algorithm accepts as input a sequence of training examples S and a distribution $D_t$ (where $D_t(i)$ could be interpreted as the misclassification cost of the i-th training example). Based on this input, the weak learner outputs a weak hypothesis (classifier) $h_t$, and the distribution $D_t$ is updated at iteration t. The hypothesis is repeated/updated using the updated distribution until a predefined iteration limit is reached. The algorithm starts out with the following training data:

$$(x_1, Y_1), \ldots, (x_m, Y_m) \quad (3)$$

where $x_i \in X$, and $Y_i \subseteq y$. For example, $x_i$ is a sentence feature vector and $Y_i$ is a list of possible sentence modes for the sentence. The algorithm initializes the distribution according to the following:

$$D_1(i, l_0, l_1) = \begin{cases} 1/(m*|Y_i|*|y-Y_i|) & \text{if } l_0 \notin Y_i \text{ and } l_1 \in Y_i \\ 0 & \text{otherwise} \end{cases} \quad (4)$$

The algorithm then trains the weak learner using distribution $D_t$ to give weak hypothesis $h_t: X \times Y \to \square$. The algorithm then chooses $\alpha_t \in \square$ and updates the distribution according to the following:

$$D_{t+1}(i, l_0, l_1) = \frac{D_t(i, l_0, l_1)\exp\left(\frac{1}{2}\alpha_t(h_t(x_i, l_0) - h_t(x_i, l_1))\right)}{Z_t} \quad (5)$$

where t identifies the iteration and $Z_t$ is a normalization factor (chosen so that $D_{t+1}$ will be a distribution). The algorithm then outputs the final hypothesis:

$$f(x, l) = \sum_{t=1}^{T} \alpha_t h_t(x, l) \quad (6)$$

The weak classifier may be defined by the following:

$$h_t(x, l) = \begin{cases} c_{0l} & \text{if } w \in x \\ c_{1l} & \text{if } w \notin x \end{cases} \quad (7)$$

where w is a word and $c_{0l}$ and $c_{1l}$ are real numbers. Given the current distribution $D_t$, the algorithm calculates the following for each possible classification l, for j=−1/+1, and b=−1/+1:

$$W_b^{jl} = \sum D_t(i, l)[x_i \in X_j \wedge Y_i[l] = b] \quad (8)$$

$$c_{jl} = \frac{1}{2}\ln\left(\frac{W_{+1}^{jl}}{W_{-1}^{jl}}\right), \alpha_t = 1 \quad (9)$$

where $X_0=\{x: w \notin x\}$, and $X_1=\{x: w \in x\}$. After the sentence classifier is trained, a sentence is classified by the following:

$$l(x)=\arg\max_l f(x,l) \quad (10)$$

where x is the sentence feature vector and l(x) is the classification.

When a support vector machine is used as a classifier, the prioritization system may need to train a separate classifier for each classification and for each rank level. For example, a sentence classifier for classification of an imperative classification and another for a declarative classification may be used. Also, a document rank classifier for a high rank and another for a low rank may be used. When classifying or ranking, the prioritization system would try each classifier and select the classification or ranking that is the best fit.

Figure 3:
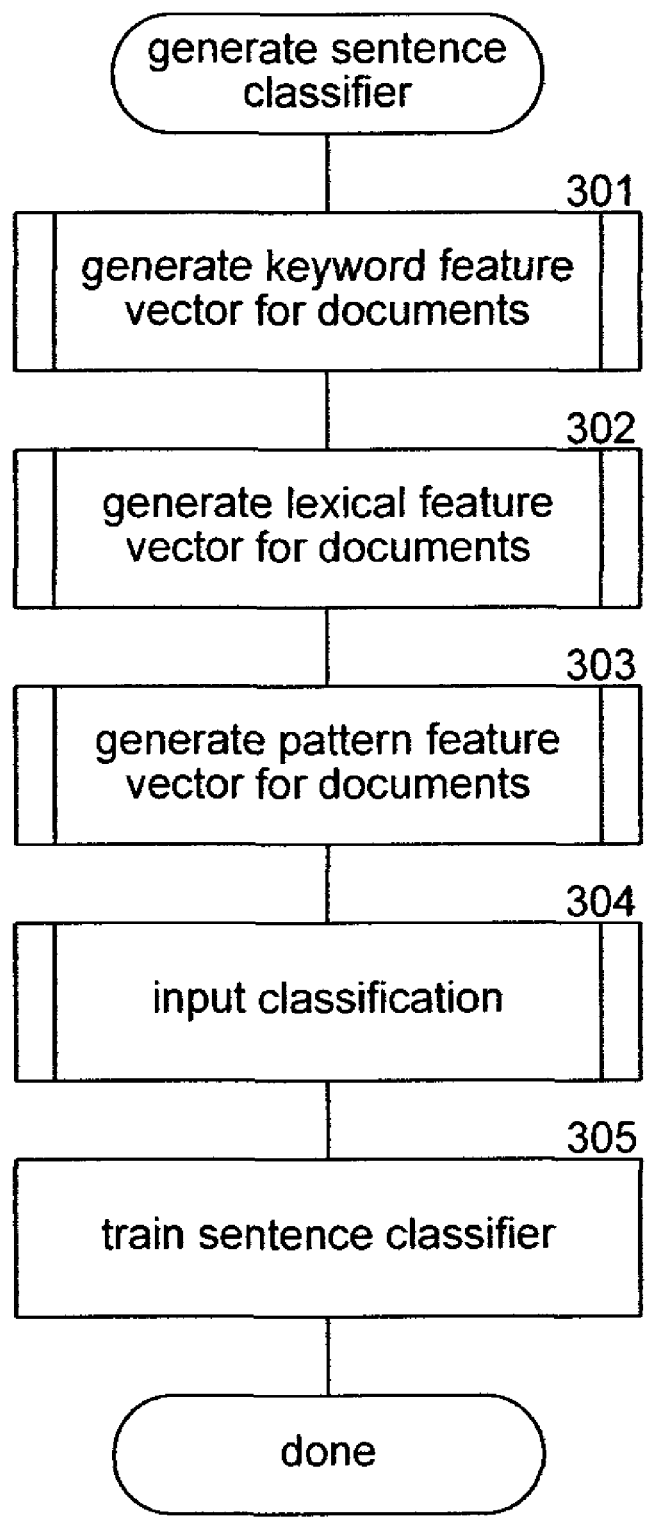
FIG. 3 is a flow diagram that illustrates processing of the generate sentence classifier component in one embodiment.

FIG. 3 is a flow diagram that illustrates processing of the generate sentence classifier component in one embodiment. The generate sentence classifier component generates a sentence feature vector for each sentence of a document within the training data, inputs the classification of each sentence, and then trains the sentence classifier. In block 301, the component invokes the generate keyword feature vector for documents component. In block 302, the component invokes the generate lexical feature vector for documents component. In block 303, the component invokes the generate pattern feature vector for documents component. The sentence feature vector of a sentence comprises the keyword feature vector, the lexical feature vector, and the pattern feature vector of the sentence. In block 304, the component inputs the classification of each sentence of each document within the training data. In block 305, the component trains the sentence classifier using the sentence feature vectors and their classifications. The component then completes.

Figure 4:
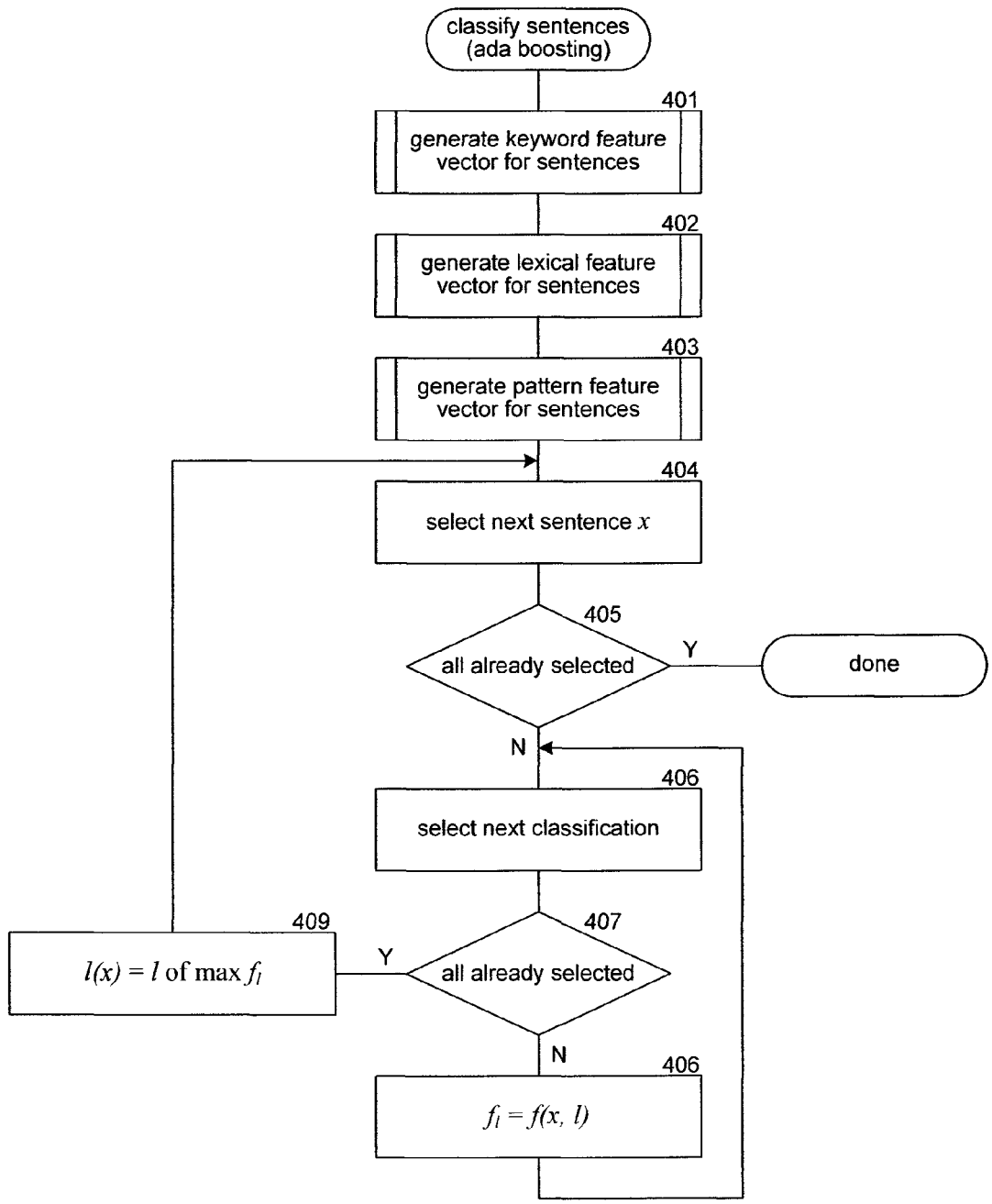
FIG. 4 is a flow diagram that illustrates processing of the classify sentences component in one embodiment.

FIG. 4 is a flow diagram that illustrates processing of the classify sentences component in one embodiment. In this embodiment, the component uses an Ada-boosting classifier. The component is passed a document and returns the classifications of the sentences of the document. In block 401, the component invokes the generate keyword feature vector for sentences component. In block 402, the component invokes the generate lexical feature vector for sentences component. In block 403, the component invokes the generate pattern feature vector for sentences component. In blocks 404-409, the component loops classifying the sentences of the document using the sentence classifier. In block 404, the component selects the next sentence of the document. In decision block 405, if all the sentences of the document have already been selected, then the component completes, else the component continues at block 406. In blocks 406-408, the component loops selecting each sentence classification and calculating a score for that sentence classification for the selected sentence using the sentence classifier. In block 406, the component selects the next sentence classification. In decision block 407, if all the sentence classifications for the selected sentence have already been selected, then the component continues at block 409, else the component continues at block 408. In block 408, the component calculates the score for the selected sentence classification and selected sentence using the sentence classifier. The component then loops to block 406 to select the next sentence classification. In block

409, the component selects the sentence classification with the highest score as the classification of the selected sentence. The component then loops to block 404 to select the next sentence.

Figure 5:
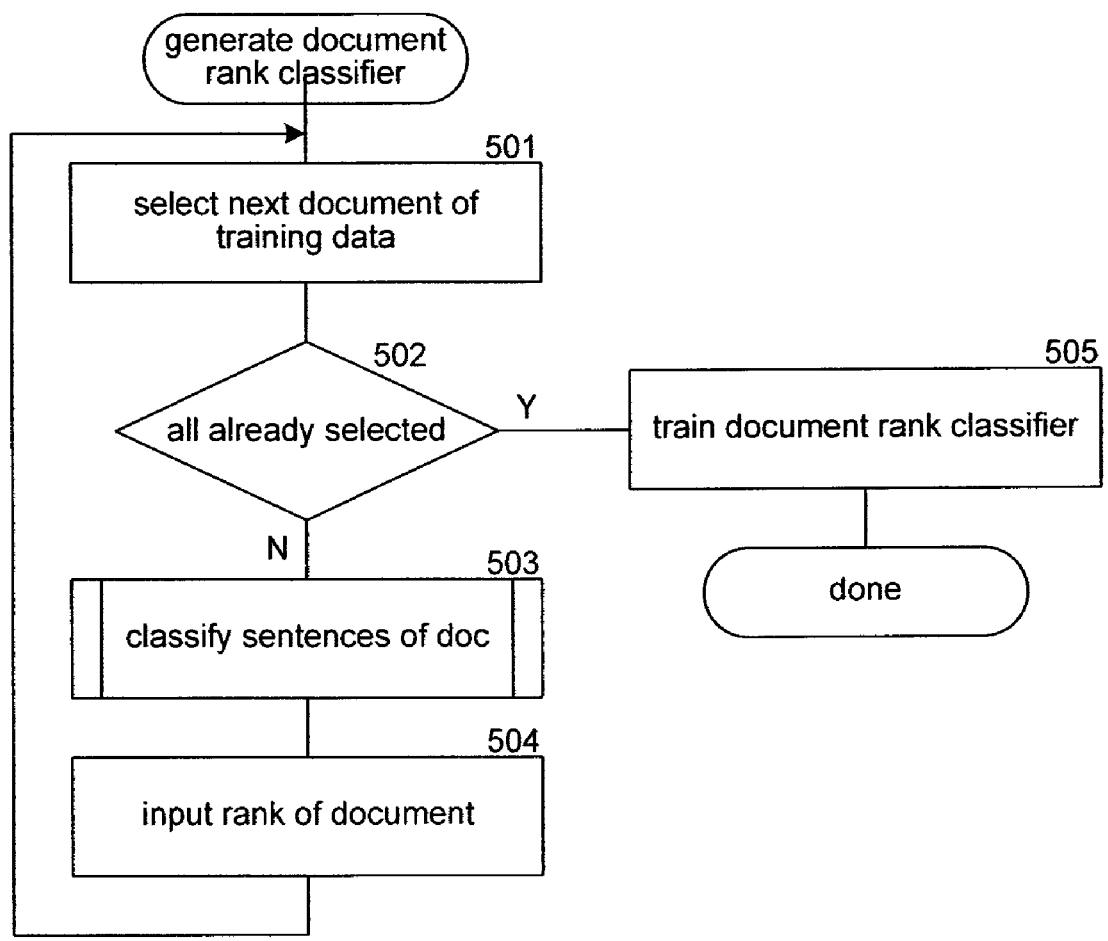
FIG. 5 is a flow diagram that illustrates processing of the generate document rank classifier component in one embodiment.

FIG. 5 is a flow diagram that illustrates processing of the generate document rank classifier component in one embodiment. The component generates a document feature vector for each document of the training data. The document feature vector of a document comprises the classification of each sentence within the document. The component then trains the classifier using document feature vector and ranking pairs for the documents of the training data. In block 501, the component selects the next document of the training data. In decision block 502, if all the documents of the training data have already been selected, then the component continues at block 505, else the component continues at block 503. In block 503, the component invokes the classify sentences of document component to generate the document feature vector for the selected document. In block 504, the component inputs the ranking of the selected document. The component then loops to block 501 to select the next document of the training data. In block 505, the component trains the document rank classifier. The component then completes.

Figure 6:
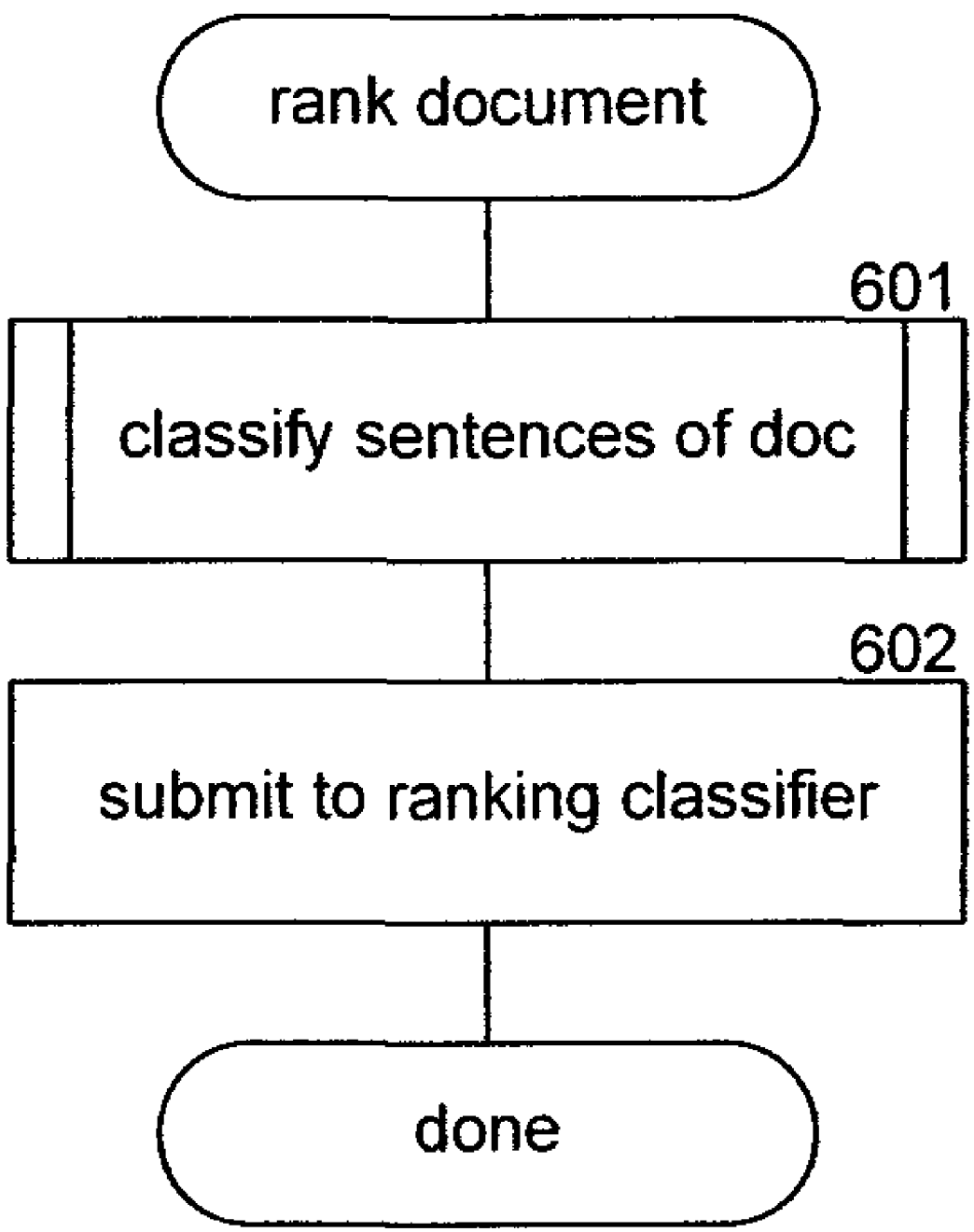
FIG. 6 is a flow diagram that illustrates processing of the rank document component in one embodiment.

FIG. 6 is a flow diagram that illustrates processing of the rank document component in one embodiment. The component is passed a document. In block 601, the component invokes the classify sentences of document component to generate the document feature vector for the passed document. In block 602, the component submits the document feature vector to the document rank classifier to generate the ranking for the passed document.

Figure 7:
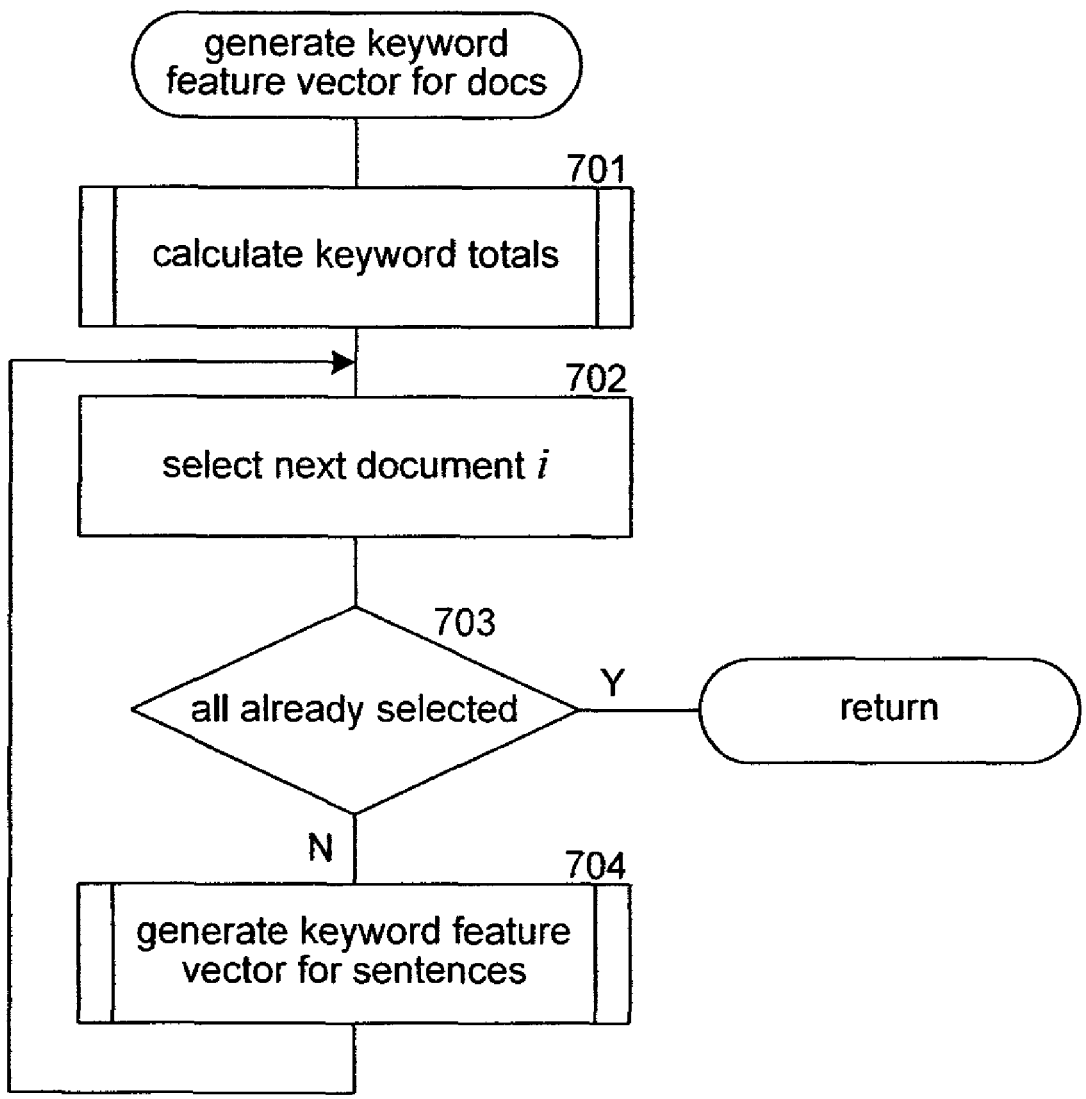
FIG. 7 is a flow diagram that illustrates processing of the generate keyword feature vector for documents component in one embodiment.

FIGS. 7-17 are flow diagrams that illustrate processing of components of the sentence classification system in one embodiment. FIG. 7 is a flow diagram that illustrates processing of the generate keyword feature vector for documents component in one embodiment. The component is passed a collection of documents (e.g., training data) and generates a keyword feature vector for each sentence of each document. In block 701, the component invokes a calculate keyword totals component to calculate keyword totals that are used when calculating the weights of the keywords. In block 702, the component selects the next document. In decision block 703, if all the documents have already been selected, then the component returns, else the component continues at block 704. In block 704, the component invokes the generate keyword feature vector for sentences component to generate the keyword feature vectors for the sentences of the selected document. The component then loops to block 702 to select the next document.

Figure 8:
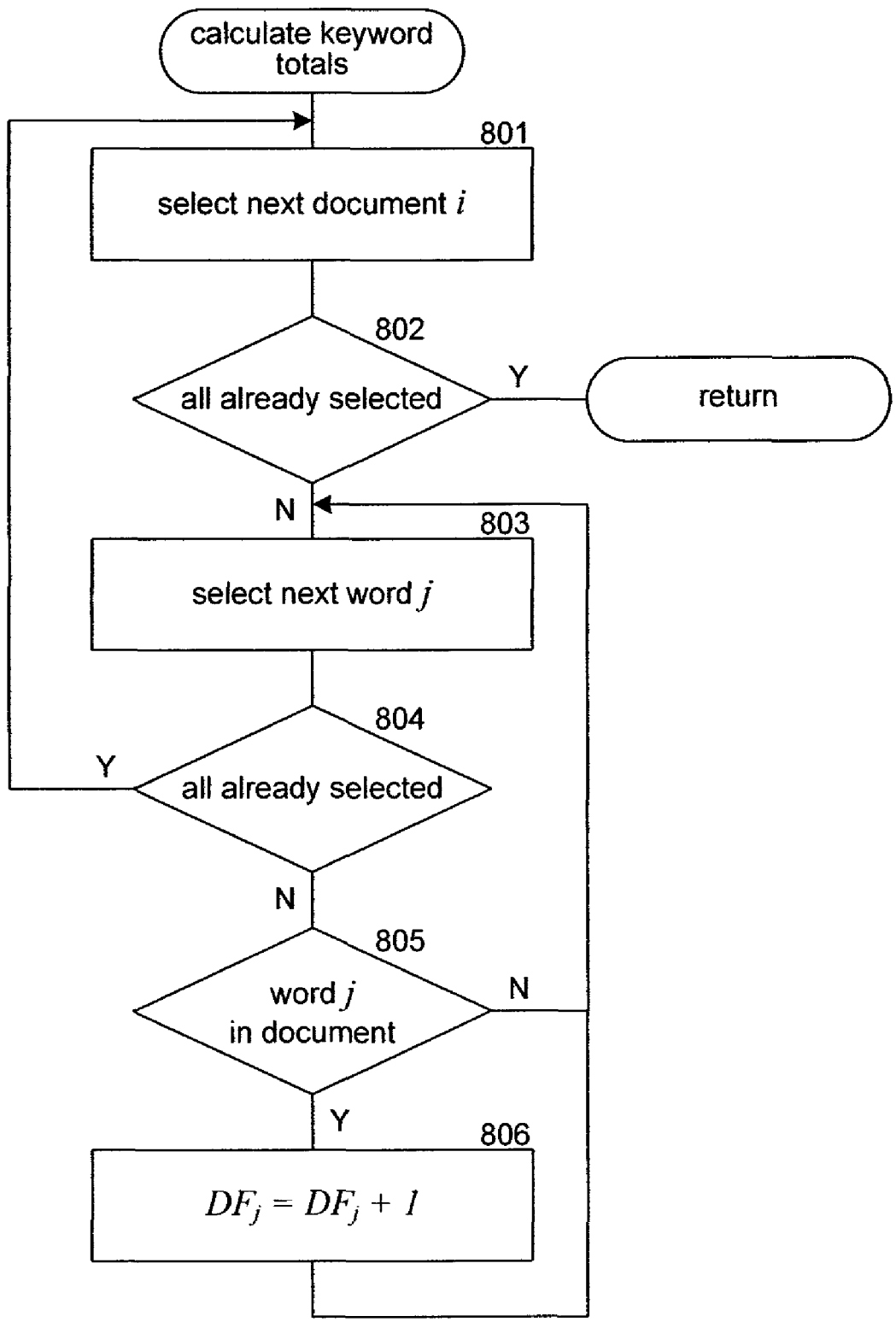
FIG. 8 is a flow diagram that illustrates processing of the calculate keyword totals component in one embodiment.

FIG. 8 is a flow diagram that illustrates processing of the calculate keyword totals component in one embodiment. The component calculates the document frequency for each keyword within a collection of documents. In block 801, the component selects the next document. In decision block 802, if all the documents have already been selected, then the component returns, else the component continues at block 803. In blocks 803-806, the component loops selecting each keyword and incrementing the document frequency for that keyword when the selected keyword is within the selected document. In block 803, the component selects the next keyword for the selected document. In decision block 804, if all the keywords have already been selected, then the component loops to block 801 to select the next document, else the component continues at block 805. In decision block 805, if the selected keyword is in the selected document, then the component continues at block 806, else the component loops to block 803 to select the next keyword. In block 806, the component increments the document frequency for the selected keyword and then loops to block 803 to select the next keyword.

Figure 9:
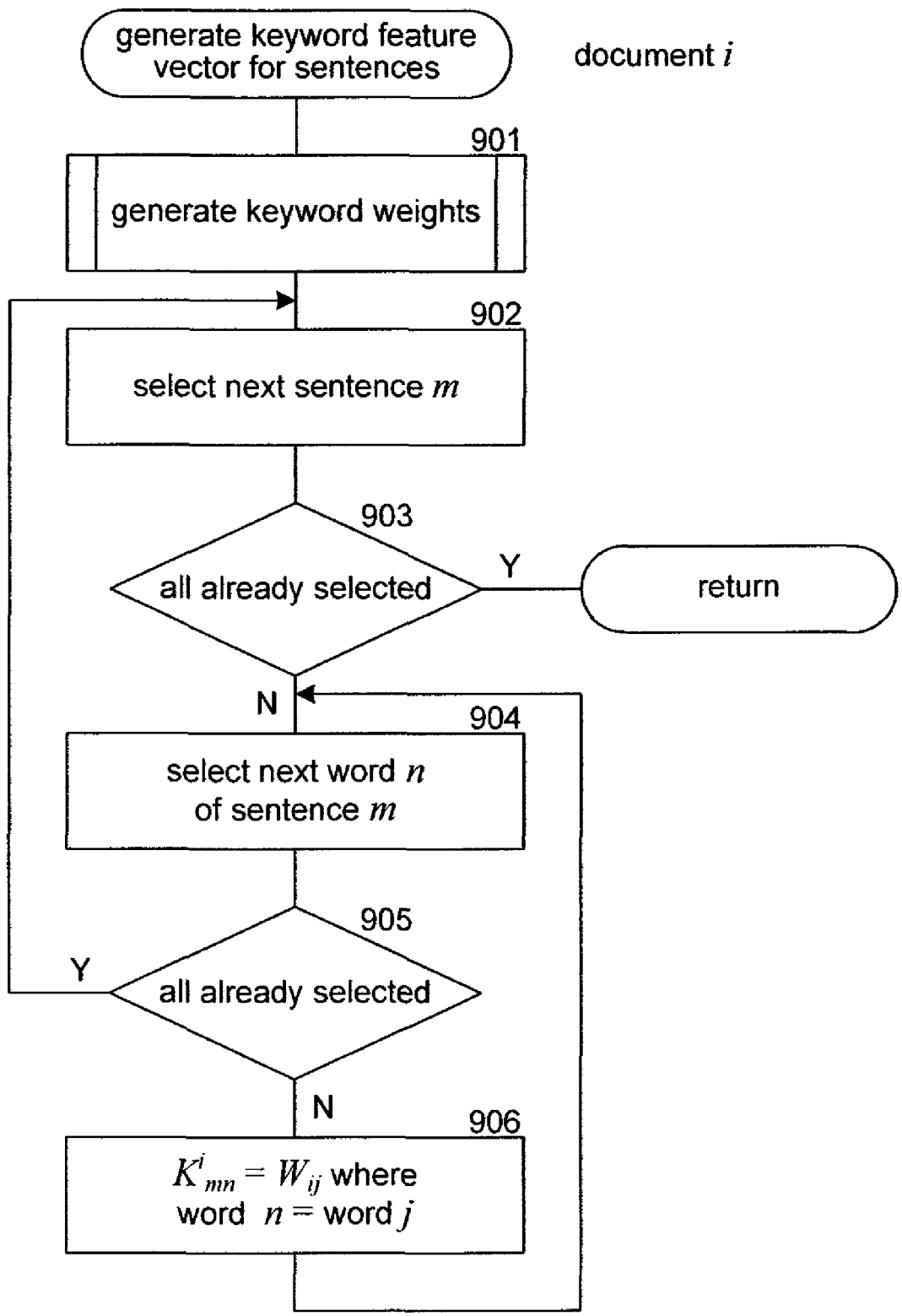
FIG. 9 is a flow diagram that illustrates processing of the generate keyword feature vector for sentences component in one embodiment.

FIG. 9 is a flow diagram that illustrates processing of the generate keyword feature vector for sentences component in one embodiment. The component is passed a document and generates a keyword feature vector for each sentence of the document. In block 901, the component invokes a generate keyword weights component to generate the keyword weights for the keywords of the passed document. In block 902, the component selects the next sentence of the passed document. In decision block 903, if all the sentences of the passed document have already been selected, then the component returns, else the component continues at block 904. In blocks 904-906, the component loops selecting each keyword of the selected sentence and adding the weight of the selected keyword to the keyword feature vector for the selected sentence. In block 904, the component selects the next keyword of the selected sentence. In decision block 905, if all the keywords of the selected sentence have already been selected, then the component loops to block 902 to select the next sentence of the passed document, else the component continues at block 906. In block 906, the component sets the next element of the keyword feature vector to the weight of the selected keyword and loops to block 904 to select the next keyword of the selected sentence.

Figure 10:
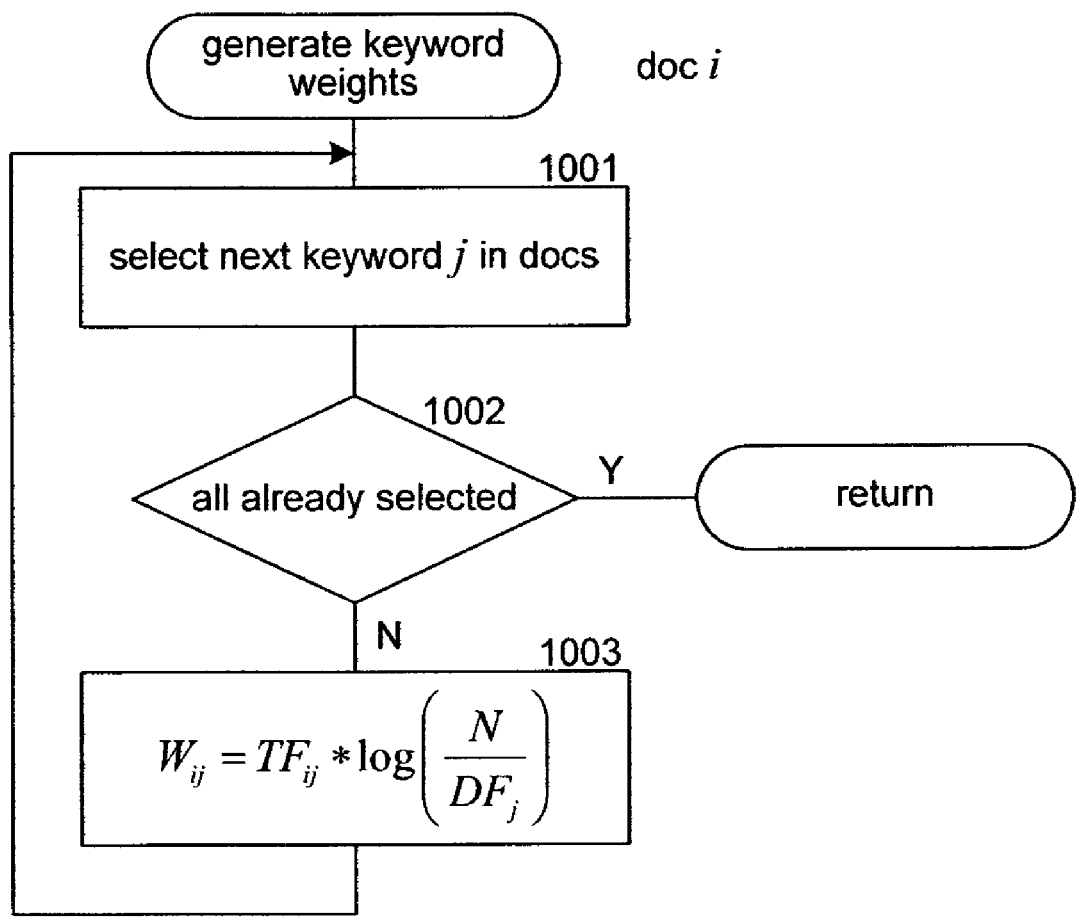
FIG. 10 is a flow diagram that illustrates processing of the generate keyword weights component in one embodiment.

FIG. 10 is a flow diagram that illustrates processing of the generate keyword weights component in one embodiment. The component is passed a document and calculates the weights of the keywords of the document using the previously calculated document frequency for the keywords. In block 1001, the component selects the next keyword. In decision block 1002, if all the keywords have already been selected, then the component returns, else the component continues at block 1003. In block 1003, the component sets the weight of the selected keyword for the passed document to the term frequency of that keyword within the selected document times the logarithm of the number of documents divided by the document frequency of that keyword. The component then loops to block 1001 to select the next keyword.

Figure 11:
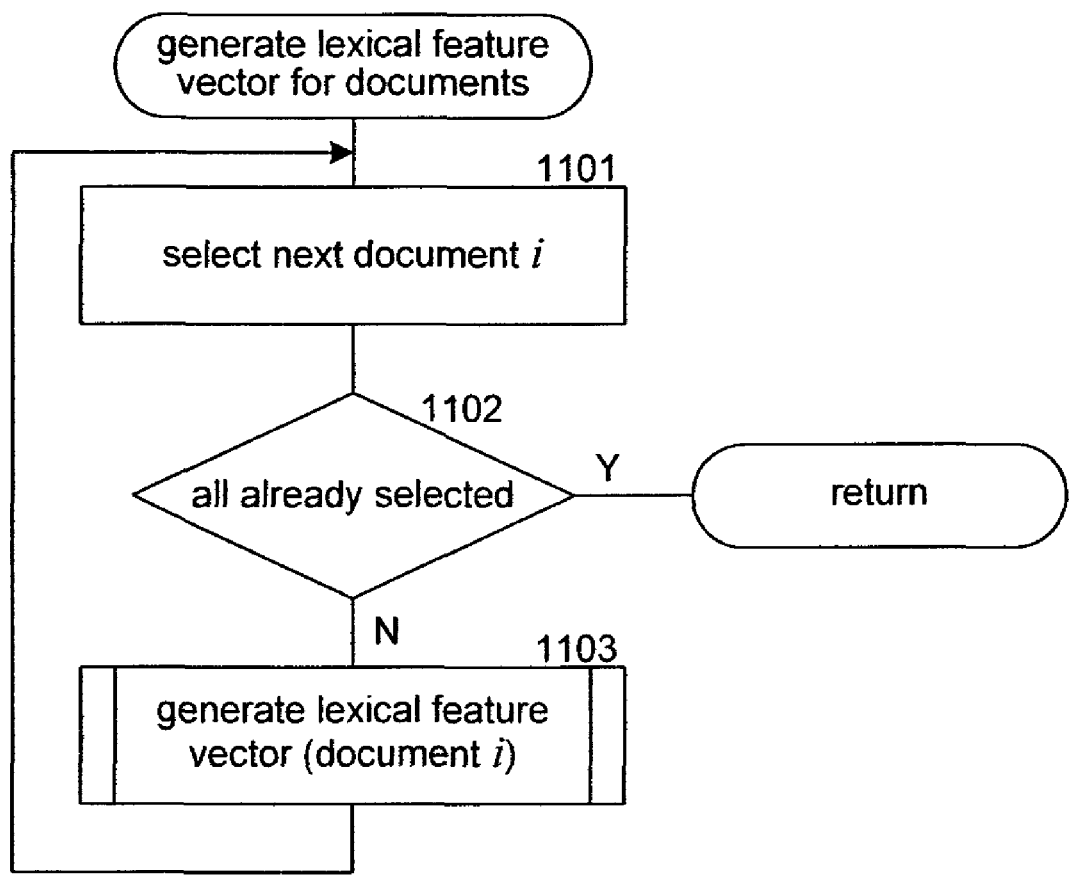
FIG. 11 is a flow diagram that illustrates processing of the generate lexical feature vector for documents component in one embodiment.

FIG. 11 is a flow diagram that illustrates processing of the generate lexical feature vector for documents component in one embodiment. The component is passed a collection of documents and generates a lexical feature vector for each sentence of each document. In block 1101, the component selects the next document in the collection. In decision block 1102, if all the documents of the collection have already been selected, then the component returns, else the component continues at block 1103. In block 1103, the component invokes the generate lexical feature vector for sentences component passing the selected document. The component then loops to block 1101 to select the next document of the passed collection.

Figure 12:
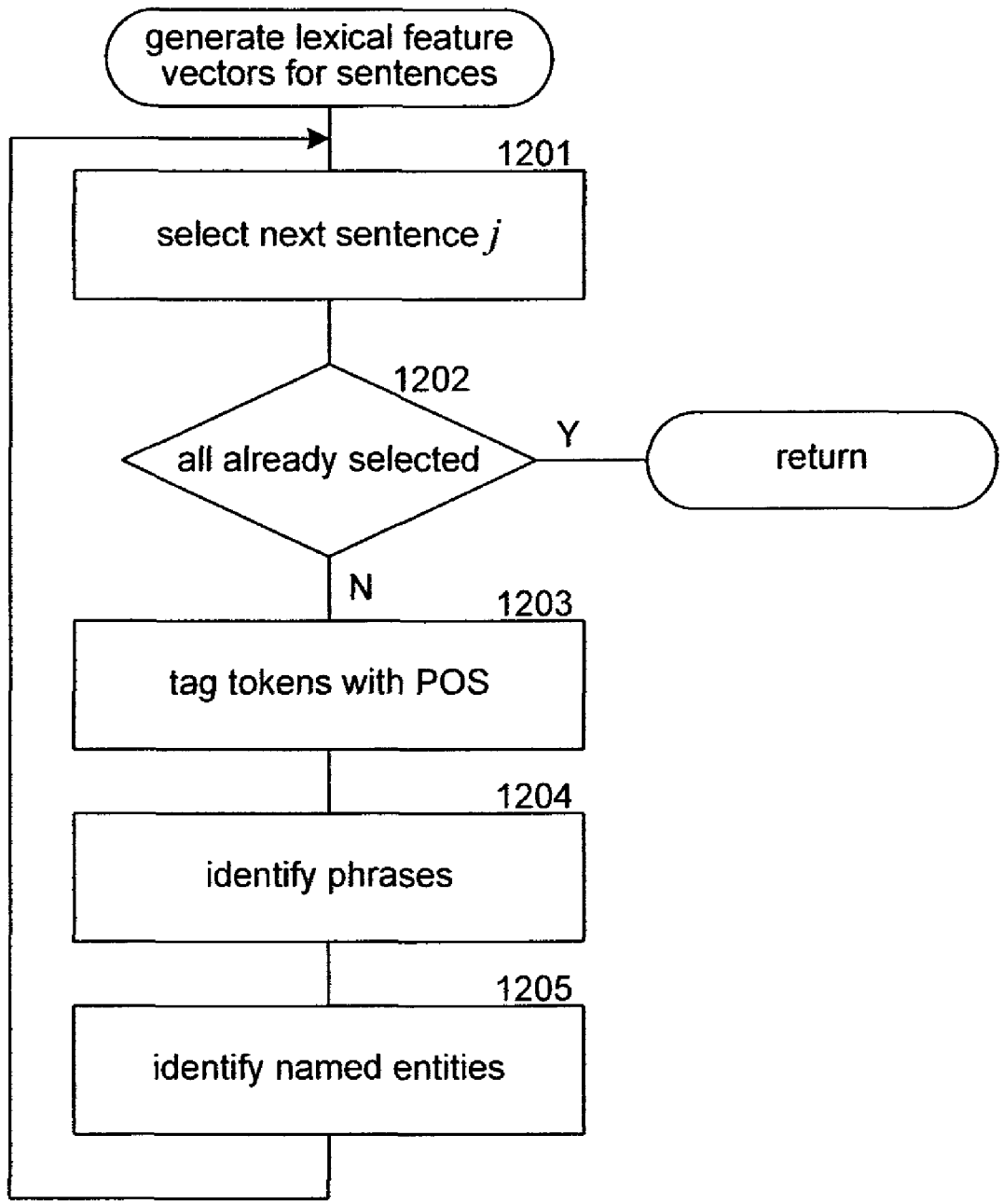
FIG. 12 is a flow diagram that illustrates processing of the generate lexical feature vector for sentences component in one embodiment.

FIG. 12 is a flow diagram that illustrates processing of the generate lexical feature vector for sentences component in one embodiment. The component is passed a document and calculates the lexical feature vectors for the sentences of that document. In block 1201, the component selects the next sentence of the passed document. In decision block 1202, if all the sentences of the passed document have already been selected, then the component returns, else the component continues at block 1203. In block 1203, the component tags the words of the selected sentence with their parts of speech. In block 1204, the component identifies the phrases within the selected sentence. In block 1205, the component identifies the named entities within the selected sentence. The component then loops to block 1201 to select the next sentence of the passed document. The component may use a natural language processor to identify the parts of speech, phrases, and named entities.

Figure 13:
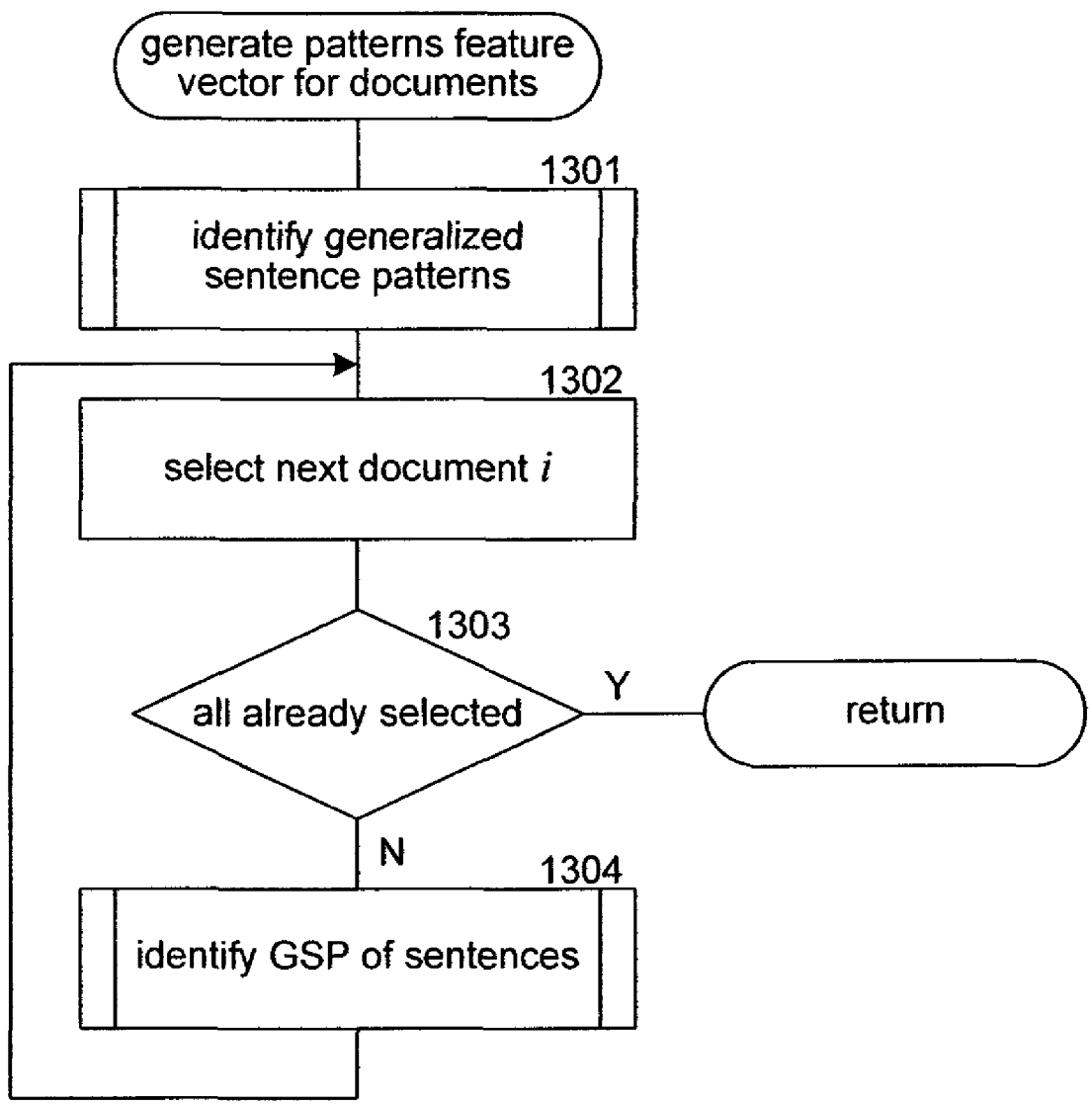
FIG. 13 is a flow diagram that illustrates processing of the generate pattern feature vector for documents component in one embodiment.

FIG. 13 is a flow diagram that illustrates processing of the generate pattern feature vector for documents component in one embodiment. The component is passed a collection of documents and generates a pattern feature vector for each sentence within each document. In block 1301, the component invokes a identify generalized sentence patterns component to identify the generalized sentence patterns of the sentences within the passed documents. In block 1302, the component selects the next document in the passed collection of documents. In decision block 1303, if all the documents of the passed collection have already been selected, then the component returns, else the component continues at block 1304. In block 1304, the component invokes a identify generalized sentence patterns of sentences component to identify the generalized sentence patterns that are most similar to the generalized sentences of the sentences of the selected document. The component then loops to block 1302 to select the next document.

Figure 14:
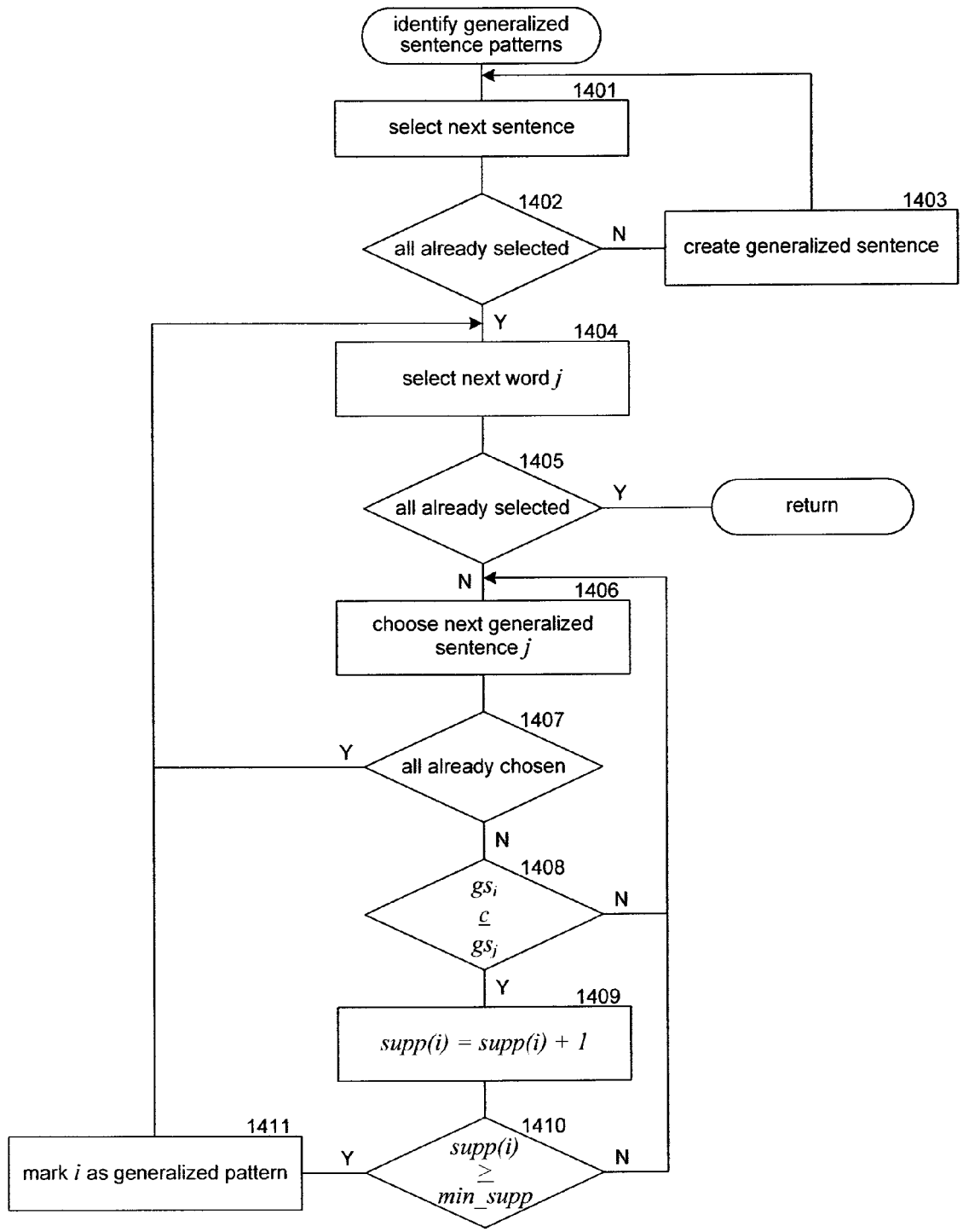
FIG. 14 is a flow diagram that illustrates processing of the identify generalized sentence patterns component in one embodiment.

FIG. 14 is a flow diagram that illustrates processing of the identify generalized sentence patterns component in one embodiment. In this embodiment, the component calculates the support for each pair of generalized sentences to be a generalized sentence pattern. The component could alternatively use a frequent itemset mining algorithm as described above. The component may use a natural language processor to create the generalized sentences. In blocks 1401-1403, the component loops creating the generalized sentence for each sentence of the passed documents. In block 1401, the component selects the next sentence of the passed documents. In decision block 1402, if all the sentences have already been selected, then the component continues at block 1404, else the component continues at block 1403. In block 1403, the component creates the generalized sentence for the selected sentence and loops to block 1401 to select the next sentence. In blocks 1404-1411, the component loops selecting each generalized sentence and marking those sentences that represent a generalized sentence pattern as a generalized sentence pattern. In block 1404, the component selects the next generalized sentence. In decision block 1405, if all the generalized sentences of the passed documents have already been selected, then the component returns, else the component continues at block 1406. In block 1406, the component chooses the next generalized sentence. In decision block 1407, if all the generalized sentences have already been chosen, then the component loops to block 1404 to select the next generalized sentence, else the component continues at block 1408. In decision block 1408, if the selected generalized sentence is contained within the chosen generalized sentence, then the component continues at block 1409, else the component loops to block 1406 to choose the next generalized sentence. In block 1409, the component increments the support for the selected generalized sentence to be a generalized sentence pattern. In decision block 1410, if the selected generalized sentence has enough support to be a generalized sentence pattern, then the component continues at block 1411, else the component loops to block 1406 to choose the next generalized sentence for the selected generalized sentence. In block 1411, the component marks the selected generalized sentence as a generalized sentence pattern and loops to block 1404 to select the next generalized sentence. The component may also prune generalized sentence patterns that are not particularly informative, such as a "noun verb" pattern.

Figure 15:
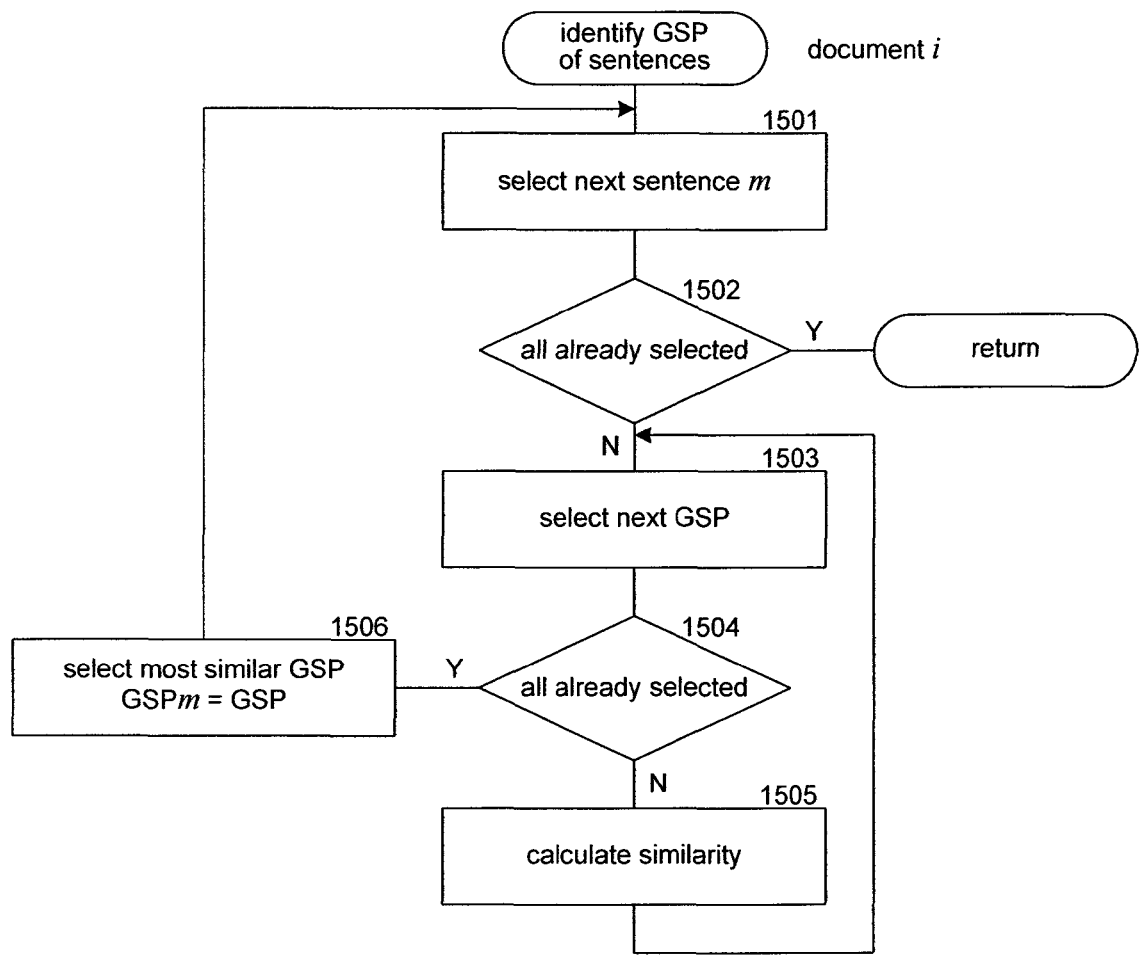
FIG. 15 is a flow diagram that illustrates processing of the identify generalized sentence patterns of sentences component in one embodiment.

FIG. 15 is a flow diagram that illustrates processing of the identify generalized sentence patterns of sentences component in one embodiment. The component is passed a document and identifies the generalized sentence pattern of each sentence within that document. In block 1501, the component selects the next sentence of the passed document. In decision block 1502, if all the sentences of the passed document have already been selected, then the component returns, else the component continues at block 1503. In blocks 1503-1505, the component loops selecting each generalized sentence pattern and calculating the similarity of the selected sentence to each generalized sentence pattern. In block 1503, the component selects a next generalized sentence pattern. In decision block 1504, if all the generalized sentence patterns have already been selected, then the component continues at block 1506, else the component continues at block 1505. In block 1505, the component calculates the similarity between the generalized sentence of the selected sentence and the selected generalized sentence pattern and then loops to block 1503 to select the next generalized sentence pattern. In block 1506, the component selects the generalized sentence pattern with the highest similarity and then loops to block 1501 to select the next sentence of the passed document.

Figure 16:
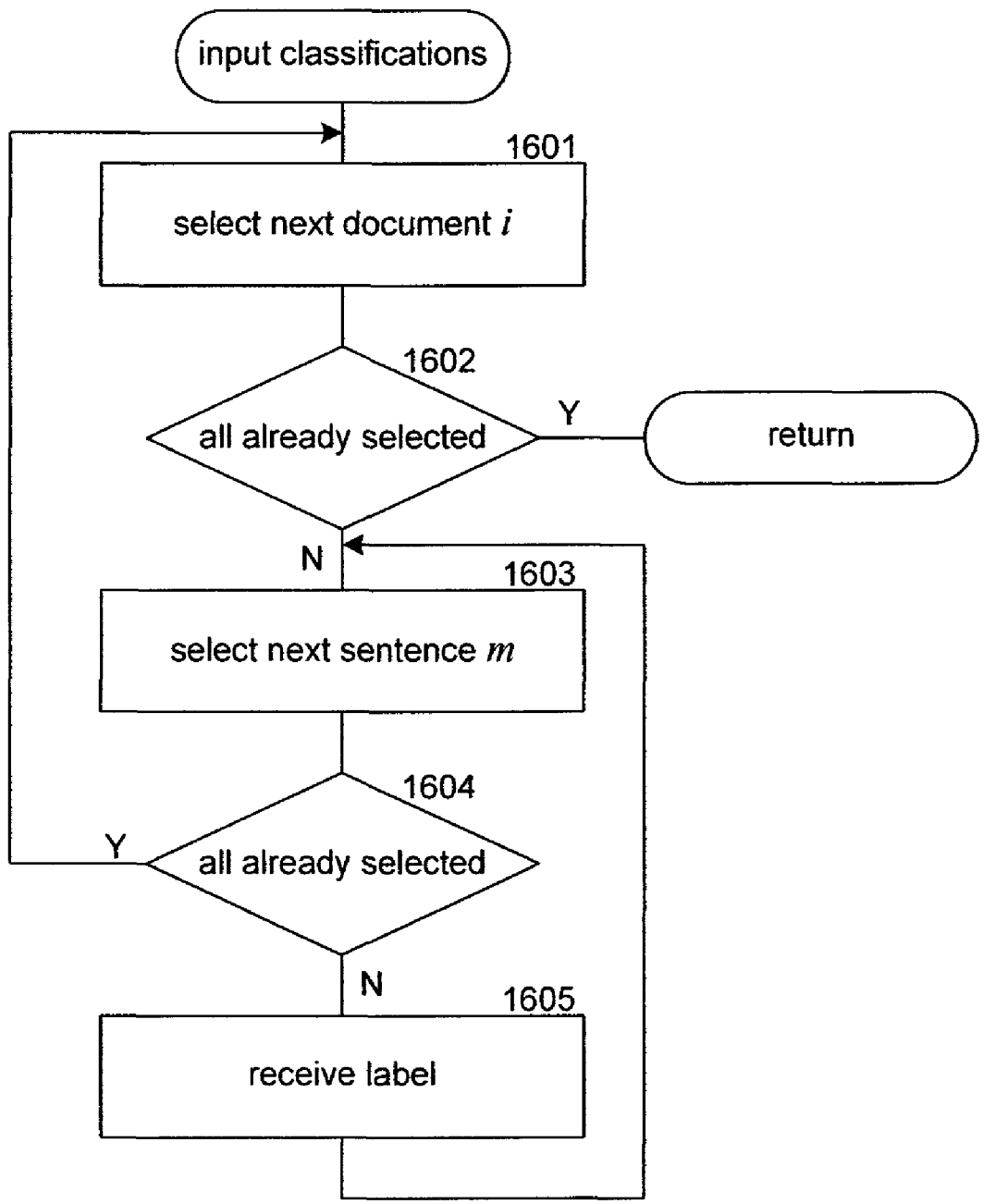
FIG. 16 is a flow diagram that illustrates processing of the input classifications component in one embodiment.

FIG. 16 is a flow diagram that illustrates processing of an input classifications component in one embodiment. The component is passed a collection of documents and inputs the classification of each sentence within each document. In block 1601, the component selects the next document in the passed collection of documents. In decision block 1602, if all the documents in the passed collection of documents have already been selected, then the component returns, else the component continues at block 1603. In block 1603, the component selects the next sentence of the selected document. In decision block 1604, if all the sentences of the selected document have already been selected, then the component loops to block 1601 to select the next document, else the component continues at block 1605. In block 1605, the component receives the classification of the selected sentence and then loops to block 1603 to select the next sentence.

Figure 17:
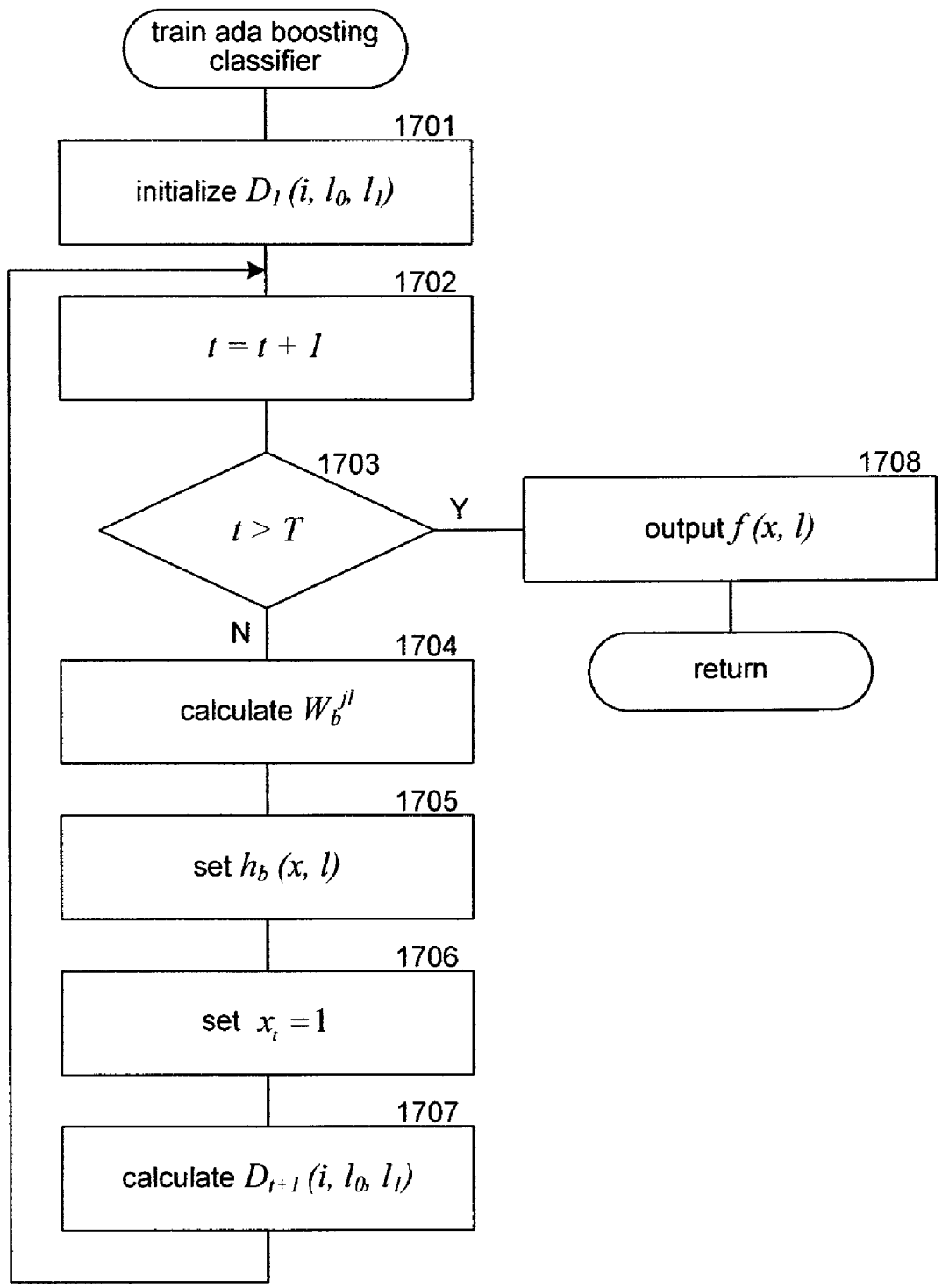
FIG. 17 is a flow diagram that illustrates processing of the train sentence classifier component in one embodiment.

FIG. 17 is a flow diagram that illustrates processing of the train sentence classifier component in one embodiment. The component implements training for an Ada-boosting classifier. In block 1701, the component initializes the distribution according to Equation 4. In blocks 1702-1707, the component loops calculating an improved hypothesis for a predefined number of iterations. In block 1702, the component increments the number of iterations. In decision block 1703, if the number of iterations has exceeded the predefined number of iterations, then the component continues at block 1708, else the component continues at block 1704. In block 1704, the component calculates a weight for this iteration according to Equation 8. In block 1705, the component sets the classifier according to Equations 7 and 9. In block 1706, the component sets weighting factors of the iterations according to Equation 9. In block 1707, the component calculates a new distribution according to Equation 5. The component then loops to block 1702 to start the processing of the next iteration. In block 1708, the component outputs the classifier according to Equation 6 and then completes.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A computer-readable medium containing instructions for controlling a computer system to rank documents, by a method comprising:
   providing a sentence classifier to classify sentences into classifications of sentences;
   training a document rank classifier by representing each document of training data by the classifications of its sentences as determined by the sentence classifier and a rank of each document;
   representing a document by the classifications of its sentences as determined by the sentence classifier; and
   applying the trained document rank classifier to the representation of the document to determine the rank of the document.

2. The computer-readable medium of claim 1 wherein the documents are electronic mail messages and including prioritizing electronic mail messages based on their ranks.

3. The computer-readable medium of claim 1 wherein the sentences are classified based on sentence mode.

4. The computer-readable medium of claim 1 wherein the sentence classifications include declarative, imperative, interrogative, and exclamatory.

5. The computer-readable medium of claim 1 wherein the sentence classifications include appreciative and attach.

6. The computer-readable medium of claim 1 wherein the training includes applying an Ada-boosting algorithm.

7. The computer-readable medium of claim 1 wherein the training includes applying a support vector machine algorithm.

8. The computer-readable medium of claim 1 wherein the providing of the sentence classifier includes:
   providing training sentences and their classifications;
   generating feature representations of the sentences;
   training a sentence classifier to classify sentences based on the generated feature representations and the classifications of the sentences they represent;
   receiving a sentence;
   generating a feature representation of the sentence; and
   applying the trained sentence classifier to the generated feature representation of the sentence to classify the sentence.

9. A computer system for ranking documents, comprising:
   a memory storing computer-executable instructions of:
      a sentence classifier;
      a document rank classifier trained based on classifications of sentences of documents, the classifications being generated using the sentence classifier, and trained based on ranks of documents; and
      a component that classifies sentences of a document using the sentence classifier, represents the document by classifications of its sentences as determined by the sentence classifier, and applies the document rank classifier to the classified sentences to generate a rank for the document; and
   a processor that executes the computer-executable instructions stored in the memory.

10. The computer system of claim 9 wherein the documents are electronic mail messages.

11. The computer system of claim 9 wherein the sentences are classified based on sentence mode.

12. The computer system of claim 9 wherein the sentence classifications include declarative, imperative, interrogative, and exclamatory.

13. The computer system of claim 12 wherein the sentence classifications include appreciative and attach.

14. The computer system of claim 9 wherein the classifiers are trained using an Ada-boosting algorithm.

15. The computer system of claim 9 wherein the classifiers are trained using a support vector machine algorithm.

* * * * *

UNITED STATES PATENT AND TRADEMARK OFFICE
CERTIFICATE OF CORRECTION

| | | |
|---|---|---|
| PATENT NO. | : 8,112,268 B2 | Page 1 of 1 |
| APPLICATION NO. | : 12/254796 | |
| DATED | : February 7, 2012 | |
| INVENTOR(S) | : Chen et al. | |

It is certified that error appears in the above-identified patent and that said Letters Patent is hereby corrected as shown below:

In the Specification
In column 8, line 2, delete "X." and insert -- X, --, therefor.

Signed and Sealed this
Seventeenth Day of February, 2015

Michelle K. Lee
*Deputy Director of the United States Patent and Trademark Office*